United States Patent [19]

Bourland, Jr. et al.

[11] Patent Number: 4,594,120

[45] Date of Patent: Jun. 10, 1986

[54] METHOD FOR INSTALLING A SEPTUM IN HONEYCOMB CORE

[75] Inventors: Gordon Bourland, Jr., Arlington; Howard M. Price, Burleson, both of Tex.

[73] Assignee: LTV Aerospace and Defense Company, Dallas, Tex.

[21] Appl. No.: 286,730

[22] Filed: Jul. 27, 1981

[51] Int. Cl.[4] .................................. B32B 31/26

[52] U.S. Cl. .................................. 156/155; 156/252; 264/156; 264/138; 264/221; 264/317

[58] Field of Search ............... 156/155, 197, 246, 252, 156/303.1; 425/176, DIG. 12; 428/116, 118; 181/284, 286, 288-296; 264/138, 154, 156, 221, 225, 271.1, 278, 313, 317, 322, DIG. 44

[56] References Cited

U.S. PATENT DOCUMENTS

| | | | |
|---|---|---|---|
| 1,339,445 | 3/1920 | Mershon . | |
| 3,021,565 | 3/1962 | Bowman . | |
| 3,064,345 | 11/1962 | Herman et al. | 264/278 X |
| 3,910,374 | 10/1975 | Holehouse | 181/292 |
| 3,948,346 | 4/1976 | Schindler | 181/292 X |
| 4,088,723 | 5/1978 | Norton | 264/221 X |
| 4,257,998 | 3/1981 | Diepenbrock, Jr. et al. | 264/156 |
| 4,265,955 | 5/1981 | Harp et al. | 428/116 |

*Primary Examiner*—Edward Kimlin
*Assistant Examiner*—Ramon R. Hoch
*Attorney, Agent, or Firm*—Stephen S. Sadacca; James M. Cate

[57] ABSTRACT

In a method of installing a septum (18) at a desired depth within a section of honeycomb core (12) for use in a sound attenuation panels, the septum is sandwiched between two layers (20, 24) of support material having a melting temperature intermediate between the fusing and curing temperatures of the septum material. The honeycomb core (12) is pressed into supporting materials and septum to segment and position the septum (18) therein, after which the resultant assembly is heated sufficiently to allow the septum to fuse and adhere to the honeycomb core. The resultant assembly is then heated sufficiently to melt the support material and allow it to be drained away, leaving the segmented septum (18) in place within the honeycomb core.

18 Claims, 13 Drawing Figures

METHOD FOR INSTALLING A SEPTUM IN HONEYCOMB CORE

TECHNICAL FIELD

The present invention relates generally to modification of a honeycomb structure, and more particularly to a method for installing a divider or septum in a honeycomb panel to be used as a Helmholtz resonator for sound attenuation.

BACKGROUND ART

In the aerospace industry, honeycomb core is commonly employed in the fabrication of various panels and assemblies to provide strength and light weight. The honeycomb core is bonded between face sheets which close the transverse cells defining the core.

Engine nacelle panels can be modified to serve as Helmholtz resonators for attenuating engine noise. This involves perforating one or both of the face sheets such that the cells of the honeycomb core communicate with the outside via small holes. The cell and hole sizes as well as the thickness of the face sheet are selected such that the structure is tuned to resonate at a preselected engine frequency. The cells of the honeycomb core act as multiple resonant chambers wherein the sound waves are broken down into waves of different, and usually higher, frequencies and wherein some of the acoustic energy is transformed into heat which dissipates into the atmosphere. U.S. Pat. Nos. 3,948,346 and 3,910,374 illustrate examples of such acoustic liners.

In some applications, it is desirable to install one or more septums in the honeycomb core to divide each cell into a plurality of cell segments such that resonance occurs at two or more frequencies. However, the typical method of installing such a divider involves splitting the honeycomb core into two layers and bonding a sheet of perforated material between the two layers. This approach is time consuming and adds expense to the resultant sound attenuation panel. In addition, contoured honeycomb cores formed according to this technique require specially formed sheets of divider material.

A need thus exists for an improved method for installing a septum in honeycomb core which does not require splitting the core.

SUMMARY OF INVENTION

The present invention comprises a method for installing a septum in a honeycomb core which overcomes the foregoing and other difficulties associated with the prior art. The present technique is particularly adapted for the installation of fusible septums in sections of metal honeycomb core to be used as acoustic liners.

In accordance with the invention, the fusible septum is sandwiched between two layers of supporting material having a melting temperature intermediate between the fusion temperature and the curing temperature of the septum. The supporting material, for example, can comprise a composition of parafin wax and polyethylene plastic resin. The honeycomb core is then pressed into the supporting material and through the septum until the desired positioning is achieved, followed by placement of the honeycomb core in an oven heated to the fusion temperature of the septum, but below the melting temperature of the supporting material, to allow the septum to fuse and adhere to the honeycomb core. After the septum has adhered to the honeycomb core, the oven is heated to the melting temperature of the supporting material which drains away leaving the septum installed within the honeycomb core.

In accordance with an alternative embodiment of the invention, the honeycomb core is first pressed into an upper layer of supporting material having a melting point intermediate between the fusion temperature and the curing temperature of the septum. The septum is then sandwiched between a supporting block and the upper layer of supporting material having the honeycomb core embedded therein. By applying additional pressure to the honeycomb core, the core is pressed through the fusible septum supported on the support block. The honeycomb core, now embedded in the upper layer of supporting material and the fusible septum, is then placed on a lower layer of supportable material having a melting temperature intermediate between the fusion temperature and curing temperature of the septum such that the septum is sandwiched between the two layers of supporting material. By applying additional force to the honeycomb core, the core is pressed into the lower layer of supporting material thereby forcing the fusible septum to a desired position intermediate of the ends of the honeycomb core. The honeycomb core is then heated in an oven to the fusion temperature of the septum, but below the melting temperature of the supporting material, to allow the septum to fuse and adhere to the honeycomb core. After the septum has adhered to the honeycomb core, the oven is heated to the melting temperature of the supporting material which drains away leaving the septum installed within the honeycomb core.

BRIEF DESCRIPTION OF DRAWINGS

A more complete understanding of the invention can be had by reference to the following Detailed Description in conjunction with the accompanying Drawing, wherein;

FIGS. 6–13 are illustrations showing an alternative method of installing the septum and the honeycomb core according to the present invention.

DETAILED DESCRIPTION

Figure 1:
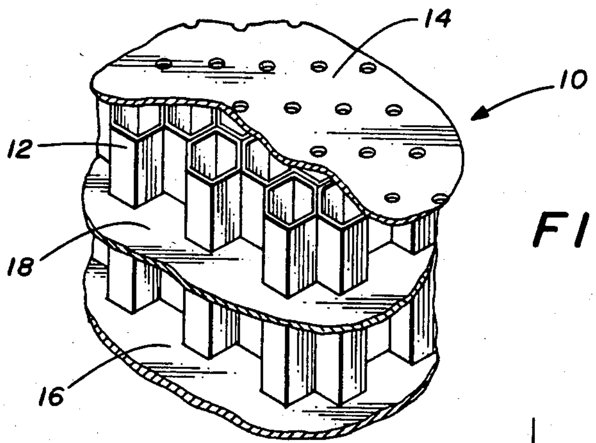
FIG. 1 is a perspective view of a portion of a sound attenuation panel with a septum installed in the honeycomb core.
Figure 2:
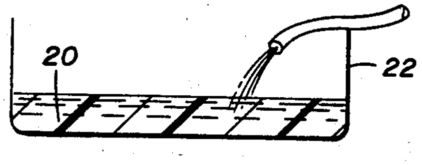
FIGS. 2–6 are illustrations showing the method of installing the septum in the honeycomb core according to the present invention.

Referring now to the Drawings, wherein like reference numerals designate corresponding elements throughout the views, and particularly referring to FIG. 1, there is shown a portion of a sound attenuation panel 10 comprising honeycomb core 12 bonded between upper and lower face sheets 14 and 16. Only upper sheet 14 is shown with perforations therein, however, either or both face sheets can be perforated. The honeycomb core 12 consists of a conventional section of aluminum honeycomb defining a mass of open cells extending between sheets 14 and 16.

A transverse septum 18 is installed in the honeycomb core 12 at a desired depth to divide each cell therein into two cell segments which communicate with the exterior of the perforations in sheet 14 so that acoustic energy is admitted into each cell. Either before or after installation of septum 18 and before attachment of sheets 14 and 16 to honeycomb core 12, the septum can be perforated to permit communication between corresponding cell segments. The thickness of septum 18 as well as the thicknesses of sheets 14 and 16, the position of the septum, the size of the cells in the honeycomb core 12, and the size and number of perforations in the septum and face sheets are selected so that panel 10 is acoustically tuned to resonate at a preselected frequency thereby attenuating noise, such as from an engine for example.

The present invention, which is illustrated in FIGS. 2–6, is directed to the method by which septum 18 is installed in honeycomb core 12. The first step involves pouring a molten material into a tray 22 to form a lower layer of support material 20 therein. Tray 22 is large enough to accept the honeycomb core 12. In accordance with a preferred embodiment, support material 20 comprises a mixture of parafin wax and polyethylene plastic resin in an appropriate proportion by weight. However, other suitable materials having a melting temperature intermediate between the fusion temperature and the curing temperature of the septum 18 can also be utilized. For example, an appropriate mixture of parafin: polyethylene weight ranges between about 88:12 and 95:5, with 91:9 being a preferred ratio at which favorable results have been obtained. Tray 22 can be formed of stainless steel or other suitable material. Since septum 18 will be supported on the upper surface of the lower layer of support material 20, the amount of material to be poured into tray 22 will depend the depth in the honeycomb core 12 to which the septum is to be installed. The first step thus involves formation in a tray of a lower layer of support material 20 of predetermined depth.

Figure 3:
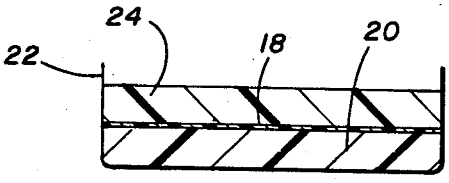

After the lower layer of support material 20 has cooled and solidified, the septum 18 is positioned on the top surface thereof, as shown in FIG. 3, followed by placement of an upper layer 24 of support material over the septum. In the preferred embodiment, the upper layer 24 of support material is comprised of the same material as the lower layer 20 and is positioned on the septum 18 in solid rather than molten state. Septum 18 is preferably comprised of a sheet of fusible material such as plastic or modified epoxy like that available from Narmco Materials, Inc. of Costa Mesa, Calif., having a fusion temperature below the melting point of the supporting materials and a resin curing temperature above the melting point of the support materials of layers 20 and 24. The thickness of septum 18 can range from about 0.01 to 0.15 inches. Septum 18 is thus sandwiched between two layers of material having a melting point intermediate between the fusion temperature and the curing temperature of the septum material.

Figure 4:
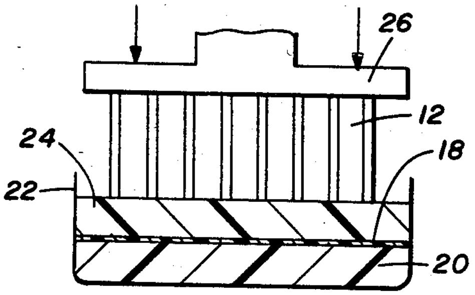

Referring now to FIG. 4, the honeycomb core 12 is then placed on the upper surface of the upper layer 24 of support material for pressing by plunger 26 through the upper layer and septum 18 and into the lower layer 20. The honeycomb core 12 is pressed at a slow uniform rate with a hydraulic press into layers 20 and 24 and septum 18. The honeycomb core 12 is pressed while the layers are at room temperature or an elevated temperature up to about 125° F. As the honeycomb core 12 is pressed downward, septum 18 and layers 20 and 24 are cut into a plurality of sandwich segments positioned within the cells of the honeycomb core. Each segment of course comprises a plug of support material/septum material/support material.

Although the preferred embodiment includes the second layer 24 of support material over septum 18, it may be desirable in some applications to omit the upper layer such that the septum is supported only on the lower layer 20. In this alternative arrangement, the honeycomb core 12 to be pressed directly through the septum and into the first layer.

Figure 5:
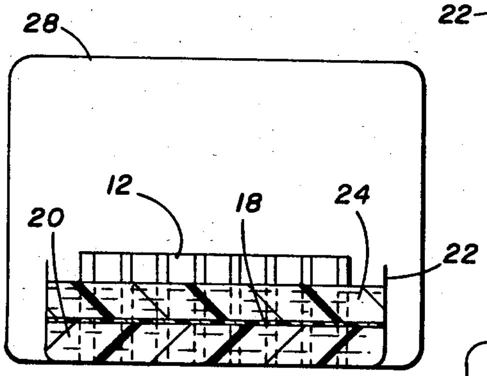
Figure 6:
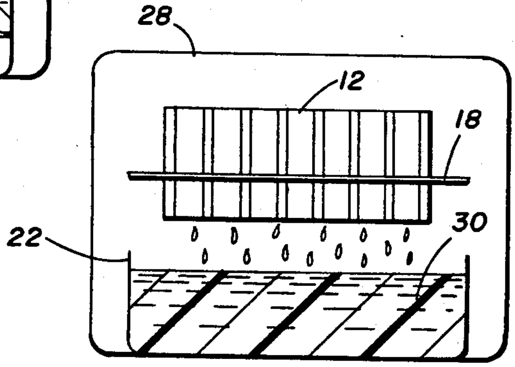
Figure 7:
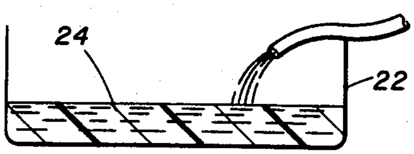

Referring to FIGS. 5 and 6, after the honeycomb core 12 has been pressed into the various layers within pan 22, the resultant assembly is placed into an oven 28 for heating. The temperature of the honeycomb core 12 and pan 22 is raised sufficiently to allow the septum to fuse and adhere to the honeycomb core without melting the support material. The fusion time and temperature can range from one to two hours at temperatures ranging from 190° F. to 200° F. After the septum has adhered to the honeycomb core, oven 28 can be heated, in the preferred embodiment wherein layers 20 and 24 are formed of parafin wax and polyethylene plastic resin, to a temperature ranging between 200° F. and 250° F. to melt the support materials. After pan 22 has been heated for a sufficient time to remelt layers 20 and 24, the honeycomb core 12 with septum 18 in place therein is lifted and suspended above the pan to allow the remaining molten support material to drain away from the honeycomb core as shown in FIG. 6. The molten support material from the upper layer 24 may be removed by tipping or inverting the honeycomb core to achieve complete drainage.

After the molten support material has drained away from the honeycomb core 12, the core can be held in oven 28 for a relatively brief additional period at the proper cure temperature, such as about 250° F. in the case of the materials mentioned herein, to cure the fusible septum 18 in place. If desired, the honeycomb core 12 can be momentarily removed from the oven 28 for vapor degreasing before returning to the part to the oven to cure septum 18 in place. As the part is being cured in oven 28, the peripheral material of each segment of septum 18 is caused to adhere to the walls defining the cells of the honeycomb core 12. After septum 18 has been cured in place, the part is removed from oven 28 and allowed to cool before installation thereof, and bonding sheets 14 and 16 to opposite sides of the honeycomb core 12.

The method herein has been illustrated and described with reference to a single septum 18 sandwiched between two layers 20 and 24 of support material, however, it will be appreciated that more than one septum can be disposed between multiple layers of support material so that several systems can be installed simultaneously in the honeycomb core 12.

An alternative method of installing the fusible septum into the honeycomb core is illustrated in FIGURES 7–13. Because the components used in the alternative method illustrated and described with respect to FIGURES 7–13 correspond to like components in the method of FIGS. 2–6, corresponding components will be designated by the same numeral as used in the method of FIGS. 2–6.

Figure 8:
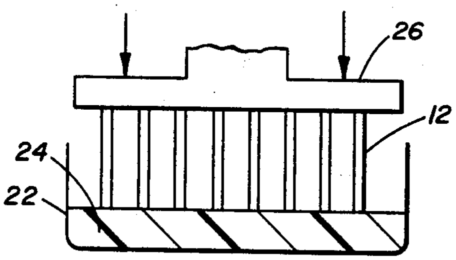

In this alternative method, molten support material is poured into tray 22 which is large enough to accept honeycomb core 12 to form an upper layer 24 of support material. The material used to form layer 24 may comprise the same mixture of parafin wax and polyethylene plastic resin as described with respect to the method of FIGURES 2–6. Of course, other suitable materials having a melting point intermediate between the fusion temperature and the curing temperature of the septum 20 may also be utilized. After the molten material has cooled and solidified, the honeycomb core 12 is positioned on the solidified material and pressed therein by plunger 26 (FIG. 8).

Figure 9:
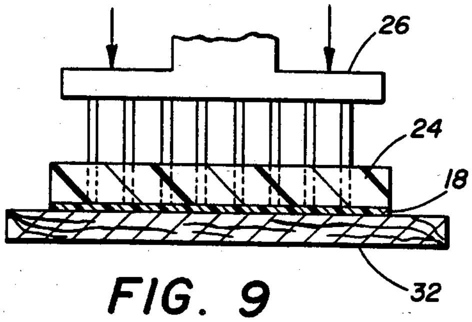

Referring to FIG. 9, thereafter, septum 18 is positioned on a relatively soft platform 32, such as wood, and the honeycomb core embedded with th elayer 24 is positioned thereover. Core 12 is then pressed through septum 18 by applying a force through plunger 26. In this stage, it has been found that the support provided by platform 32 facilitates the engagement of the honeycomb core through the septum.

Figure 10:
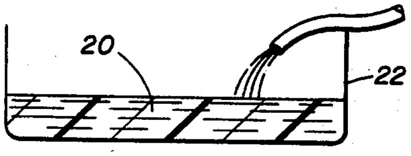
Figure 11:
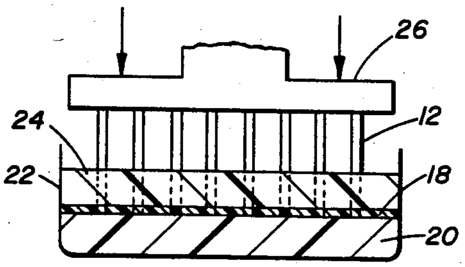

Referring to FIGS. 10 and 11, a lower layer 20 of molten support material is poured into tray 22 and allowed to solidify. The combination of the septum 18 and layer 24 with the honeycomb core 12 pressed therein is positioned above layer 20. Honeycomb core 12 is thereafter pressed into layer 20 using plunger 26 and a force applied thereto.

Figure 12:
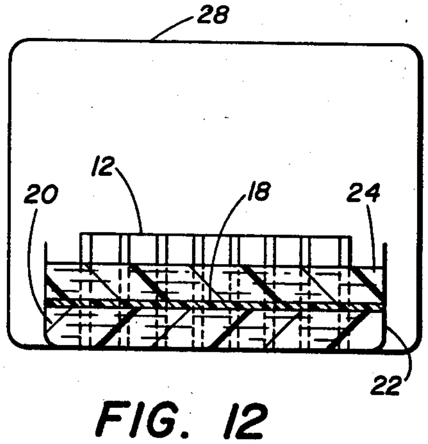
Figure 13:
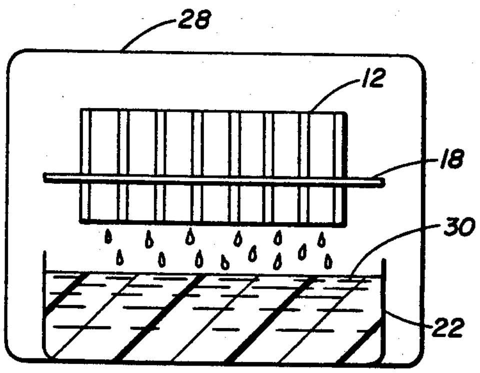

Referring to FIGS. 12 and 13, after the honeycomb core 12 has been pressed into layers 20 and 24, with the septum 18 sandwiched therebetween, the resultant assembly is placed into an oven 28 for heating. The temperature of the honeycomb core 12 and pan 22 is raised sufficiently to allow the septum to fuse and adhere to the honeycomb core, typically one to two hours at 190° F. to 200° F. After the septum has adhered to the honeycomb core, the temperature is raised sufficiently to melt the two layers 20 and 24 of the support material. As disclosed with respect to the method illustrated in FIGS. 2–6, wherein layers 20 and 24 are formed of parafin wax and polyethylene plastic resin, the temperature of oven 28 can range between 200° F. and 250° F. After pan 22 has been heated for a sufficient time to melt layers 20 and 24, the honeycomb core 12 with septum 18 in place therein is lifted and suspended above the pan to allow the remaining molten support material to drain away from the honeycomb core as shown in FIG. 13. The molten support material from the upper layer 24 may be removed by tipping or inverting the honeycomb core 12 to complete the drainage.

Curing of the completed assembly is accomplished identically to that disclosed with respect to the method of the embodiment illustrated in FIGS. 2–6.

As has been indicated with respect to the method illustrated in FIGS. 2–6, more than one septum can be disposed between multiple layers of support material to provide a plurality of spaced septums interspersed between the outer skins of the honeycomb panel. In this way, each cell of the honeycomb core may be divided into a plurality of cell segments.

While the methods disclosed and described with respect to FIGS. 2 through 6 and FIGS. 7 through 13 disclose the use of an upper layer of support material above the septum, it will be understood that the septum may be positioned to a desired depth within the honeycomb without the use of the upper layer of support material. The use of the upper layer of support material in the methods as described provides added rigidity and therefore permits the use of honeycomb cores normally used in aircraft structures. The elimination of the upper support material will require that the honeycomb core used be sufficiently rigid so that is may pierce the septum without deforming. While this may require the use of a more rigid honeycomb structure, it will be appreciated by those skilled in the art that elimination of the upper layer of support material is possible. The present invention is intended to cover such a method and product produced thereby.

From the foregoing, it will thus be apparent that the present invention comprises a method for installing a fusible septum into a metal honeycomb core having several advantages over the prior art. The technique herein permits installation of a septum at any desired depth without splitting the honeycomb core to facilitate fabrication of sound attenuation panels. Other advantages will be apparent to those skilled in the art.

Although particular embodiments of the invention have been illustrated in the accompanying Drawings and described in the foregoing Detailed Description, it will be understood that the invention is not limited to the embodiments disclosed, but is intended to embrace any equivalents, alternatives, modifications and/or rearrangements of elements falling within the scope of the invention as defined by the following claims.

We claim:

1. A method for installing a transverse septum into a honeycomb core comprising the steps of:

sandwiching the septum in a support material having a melting temperature above the fusing temperature of the septum;

pressing the honeycomb core into the support material and through the septum to segment said septum in segments and position the septum at a predetermined depth within the cells of said honeycomb core;

heating the honeycomb core, segmented septum and support material sufficiently to fuse and adhere the septum to the honeycomb core;

subsequently heating the honeycomb core, segmented septum and supporting material sufficiently to melt the supporting material;

draining the molten support material away from the honeycomb core and segmented septum in place therein and heating the honeycomb core and segmented septum to a temperature above the melting point of the support material which also has a melting temperature that is less than the temperature for curing the system for a sufficient period of time to cure the septum in place.

2. The method of claim 1 wherein the septum is formed of fusible material.

3. The method of claim 1 wherein the support material comprises a mixture of wax and plastic.

4. The method of claim 1 wherein the honeycomb core comprises metal.

5. The method of claim 1 wherein the support material comprises a mixture of wax and plastic, and wherein the heating step to remove the molten support material takes place at about 200° to 250° F.

6. The method of claim 1 wherein the sandwiching step comprises the steps of:

pouring molten support material into a pan;

allowing the molten support material to cool and solidify into a first layer;

positioning the septum on the first layer; and positioning a second layer of solidified support material on the septum.

7. A method of installing a plastic septum at a predetermined depth in an aluminum honeycomb core, comprising the steps of:

pouring molten wax/plastic composition into a pan to a depth no less than the predetermined depth to which the septum is to be installed within the honeycomb core;

allowing the molten wax/plastic composition to cool and solidify into a bottom support layer;

positioning the plastic septum on the bottom support layer;

positioning a top support layer of solid wax/plastic composition on the plastic septum;

pressing the honeycomb core through the top support layer and septum and into the bottom support layer such that segments of said septum are positioned at the predetermined depth within the cells of said honeycomb core;

heating the resultant assemly sufficiently to allow the septum to fuse to the honeycomb core;

subsequently heating the resultant assembly to a higher temperature to remelt the wax/plastic material of the top and bottom support layers such that the molten wax/plastic material of the top and bottom support layers may be drained away from said honeycomb core and the segmented septum embedded therein;

subsequently heating the resultant assembly to a higher temperature to fully cure the septum in place; and allowing the honeycomb core with segmented septum in place therein to cool.

8. A method for installing a transverse septum into a honeycomb core comprising the steps of:

sandwiching the septum between upper and lower layers of support material, wherein said support layers have a melting temperature intermediate between the fusion temperature and the curing temperature of the septum;

pressing the honeycomb core through the upper layer of support material, then the septum, and then into the lower layer of support material to segment said septum in segments and position the septum at a predetermined depth within the cells of said honeycomb core;

heating the honeycomb core, segmented septum and support layers to a first temperature to allow the septum to fuse and adhere to the honeycomb core;

subsequently heating the honeycomb core, segmented septum and supporting layers to a second temperature above said first temperature to melt the support layers;

draining the molten support layers from the honeycomb core with segmented septum in place therein; and subsequently heating the honeycomb core and segmented septum to a third temperature above said second temperature to cure the septum.

9. The method of claim 8 wherein the septum is formed of fusible material.

10. The method of claim 8 wherein the support layers comprise a mixture of wax and plastic.

11. The method of claim 8 wherein the honeycomb core comprises metal.

12. The method of claim 8 wherein the support layers comprise a mixture of wax and plastic, and wherein the heating step to remove the molten support layers takes place at about 200° to 250° F.

13. A method of installing a septum at a predetermined depth in a honeycomb core comprising the steps of:

pouring molten support material into a container, said support material having a melting temperature greater than the fusing temperature of the septum;

allowing the molten support material to cool and resolidify into an upper layer;

pressing the honeycomb core through the upper layer of support material;

positioning the honeycomb core embedded in the upper layer of the support material over the septum supported on a support structure;

pressing the honeycomb core through the septum;

forming a lower layer of support material having a melting temperature intermediate between the fusing and curing temperature of the septum and a thickness no less than the depth at which the septum is to be installed into the honeycomb core;

placing the septum and upper layer having the honeycomb core pressed therein over the lower layer of support material such that the septum is sandwiched between the lower and upper layers of support material;

pressing the honeycomb core through the lower layer of support material;

heating the honeycomb core, septum and layers of support material sufficiently to allow the septum to fuse and adhere to the honeycomb core, then heating the honeycomb core, septum and layers of support material sufficiently to melt the support material; and draining the molten support material away from the honeycomb core and septum in place therein.

14. The method according to claim 13 wherein the melting temperature of the support material forming the upper and lower layers of support material is less than the temperature for curing the septum, and further comprising heating the honeycomb core and septum to a temperature above the melting point of said support material to cure the septum.

15. The method of claim 13 wherein the septum is formed of fusible material.

16. The method of claim 13 wherein the support material comprises a mixture of wax and plastic.

17. The method of claim 13 wherein the honeycomb core comprises metal.

18. The method of claim 13 wherein the support material comprises a mixture of wax and plastic, and wherein the heating step to remove the molten support material takes place at about 200° to 250° F.

* * * * *